(12) United States Patent
Satomi

(10) Patent No.: US 11,375,066 B2
(45) Date of Patent: Jun. 28, 2022

(54) ECHO SUPPRESSION DEVICE, ECHO SUPPRESSION METHOD, AND ECHO SUPPRESSION PROGRAM

(71) Applicant: TRANSTRON INC., Kanagawa (JP)

(72) Inventor: Yuki Satomi, Kanagawa (JP)

(73) Assignee: TRANSTRON INC., Kanagawa (JP)

( * ) Notice: Subject to any disclaimer, the term of this patent is extended or adjusted under 35 U.S.C. 154(b) by 0 days.

(21) Appl. No.: 16/973,930

(22) PCT Filed: Jun. 5, 2019

(86) PCT No.: PCT/JP2019/022289
§ 371 (c)(1),
(2) Date: Dec. 10, 2020

(87) PCT Pub. No.: WO2019/239977
PCT Pub. Date: Dec. 19, 2019

(65) Prior Publication Data
US 2021/0211546 A1 Jul. 8, 2021

(30) Foreign Application Priority Data
Jun. 14, 2018 (JP) .............................. JP2018-113575

(51) Int. Cl.
*H04M 9/08* (2006.01)
*H04B 3/20* (2006.01)
(52) U.S. Cl.
CPC .............. *H04M 9/082* (2013.01); *H04B 3/20* (2013.01)

(58) Field of Classification Search
CPC ............ H04M 9/082; H04M 9/08; H04B 3/20
See application file for complete search history.

(56) References Cited

U.S. PATENT DOCUMENTS

| 6,148,078 A | 11/2000 | Romesburg | |
|---|---|---|---|
| 10,938,992 B1* | 3/2021 | Truong | H04M 3/568 |
| 10,984,815 B1* | 4/2021 | Pandey | H04R 3/005 |
| 11,039,015 B2* | 6/2021 | Jia | H04N 7/152 |
| 2007/0206777 A1 | 9/2007 | Fadili et al. | |

(Continued)

FOREIGN PATENT DOCUMENTS

| CN | 102118530 B | 8/2013 |
|---|---|---|
| JP | H04-196624 A | 7/1992 |

(Continued)

OTHER PUBLICATIONS

WIPO, International Search Report for PCT/JP2019/022289, dated Jul. 30, 2019.

(Continued)

*Primary Examiner* — Lisa Hashem

(57) ABSTRACT

An echo is allowed to be effectively removed while a processing load on an arithmetic device is reduced. When a magnitude of a reference signal transmitted to a speaker is equal to or greater than a first threshold, a learning algorithm using nonlinear processing is selected. When the magnitude of the reference signal is smaller than the first threshold, a learning algorithm using linear processing is selected. The echo is learnt using the selected learning algorithm to remove an echo included in an input signal picked up by a microphone based on a learning result.

5 Claims, 5 Drawing Sheets

(56) References Cited

U.S. PATENT DOCUMENTS

| | | | |
|---|---|---|---|
| 2010/0311471 A1* | 12/2010 | Herve | H04M 9/082 |
| | | | 455/569.2 |
| 2012/0072210 A1 | 3/2012 | Suzuki et al. | |
| 2016/0086618 A1* | 3/2016 | Neoran | G10L 21/0264 |
| | | | 704/205 |
| 2018/0007482 A1* | 1/2018 | Skoglund | G01N 29/4427 |
| 2018/0255183 A1* | 9/2018 | Zhou | H04M 9/082 |
| 2019/0027160 A1* | 1/2019 | Liang | H04R 3/04 |
| 2020/0152219 A1* | 5/2020 | Christoph | G06F 17/17 |
| 2020/0160876 A1* | 5/2020 | Christoph | G10L 21/0232 |
| 2021/0211546 A1* | 7/2021 | Satomi | H04B 3/20 |
| 2022/0036910 A1* | 2/2022 | Tanaka | H04S 7/307 |
| 2022/0044695 A1* | 2/2022 | Giacobello | G10L 21/0208 |

FOREIGN PATENT DOCUMENTS

| | | |
|---|---|---|
| JP | H05-14131 A | 1/1993 |
| JP | H07-303068 A | 11/1995 |
| JP | 2000-165301 A | 6/2000 |
| JP | 2002-501336 A | 1/2002 |
| JP | 2003-134004 A | 5/2003 |
| JP | 2010-226629 A | 10/2010 |

OTHER PUBLICATIONS

WIPO, Written Opinion for PCT/JP2019/022289, dated Jul. 30, 2019.
EPO, Extended European Search Report for European Patent Application No. 19818729.6, dated Mar. 25, 2021.
Russia Federal Public Office "The Federal Institute of Industrial Property (FIIP)", Office action for 2020139025/07 (072459), dated Aug. 11, 2021.

* cited by examiner

ECHO SUPPRESSION DEVICE, ECHO SUPPRESSION METHOD, AND ECHO SUPPRESSION PROGRAM

TECHNICAL FIELD

The present invention relates to an echo suppression device, an echo suppression method, and an echo suppression program.

BACKGROUND ART

Patent Document 1 discloses that, when a far-end speaker is in an untransmitted state, learning an echo path estimation/pseudo-echo generation circuit is stopped. In the invention disclosed in Patent Document 1, when an index ERLE representing a height of cancellation capability of an echo suppression device is somewhat smaller than an S/N ratio of a true echo to a noise, a parameter a used in a learning algorithm is set to $\alpha=1$, and a gradually decreases as the ERLE approaches the S/N ratio or becomes greater than the S/N ratio.

Patent Document 2 discloses an echo suppression device that includes an amplifier to examine a receiving signal level at which a speaker amplifier is saturated on a receiving signal input side and a clipping circuit having a clipping threshold according to the examination result on an input side of a prediction filter. An amount of echo cancellation is not deteriorated even when an output from the speaker amplifier is saturated.

CITATION LIST

Patent Document

Patent Document 1: JP 7-303068 A
Patent Document 2: JP 2003-134004 A

Summary of Invention

Technical Problem

However, the inventions described in Patent Documents 1 and 2 have a problem of heavy arithmetic load.

In light of the foregoing, an object of the present invention is to provide an echo suppression device, an echo suppression method, and an echo suppression program that allow effectively removing an echo while reducing a processing load on an arithmetic device.

Solution to Problem

An echo suppression device according to the present invention is provided in a transmitting signal path that transmits an input signal picked up by a microphone of a terminal including a speaker and the microphone. The echo suppression device includes an algorithm selection unit, an echo learning unit, and an echo removal unit. The algorithm selection unit is configured to select a learning algorithm to learn an echo based on a magnitude of a reference signal transmitted to the speaker. The echo learning unit is configured to learn the echo using the learning algorithm selected by the algorithm selection unit. The echo removal unit is configured to remove an echo included in the input signal based on a learning result by the echo learning unit. The algorithm selection unit is configured such that when the magnitude of the reference signal is equal to or greater than a first threshold, the algorithm selection unit selects a learning algorithm using nonlinear processing and when the magnitude of the reference signal is smaller than the first threshold, the algorithm selection unit selects a learning algorithm using linear processing.

According to the present invention, when the magnitude of the reference signal transmitted to the speaker is equal to or greater than the first threshold, the learning algorithm using the nonlinear processing is selected. When the magnitude of the reference signal is smaller than the first threshold, the learning algorithm using the linear processing is selected. The echo is learnt using the selected learning algorithm to remove the echo included in the input signal picked up by the microphone based on the learning result. Since the learning algorithm using the linear processing features a small amount of calculation, processing load on an arithmetic device can be reduced. The use of the learning algorithm using the nonlinear processing allows effectively removing the echo in a case where a nonlinear distortion occurs.

The echo suppression device may further include a converting unit configured to convert the reference signal into a function of a frequency domain. The algorithm selection unit may be configured to select the learning algorithm for each of a plurality of frequency bands divided at a predetermined interval. The echo learning unit may be configured to learn the echo included in the reference signal using the learning algorithm for each of the frequency bands. The echo removal unit may be configured to remove the echo based on the learning result by the echo learning unit for each of the frequency bands. By thus removing the echo for each of the frequency bands, the echo can be more reliably removed.

The echo suppression device may further include a removal necessity determining unit configured to determine whether to remove the echo based on the magnitude of the reference signal. The removal necessity determining unit may be configured such that when the magnitude of the reference signal is smaller than a second threshold smaller than the first threshold, the removal necessity determining unit determines that the echo is not removed by the echo removal unit. This allows omitting an unnecessary calculation, reducing a processing load on the arithmetic device, and clearly transmitting a picked up sound.

The echo removal unit may be configured to remove the echo using a same calculation formula for the learning result learnt by any learning algorithm. According to this configuration, the used learning algorithm can be naturally switched without an uncomfortable feeling.

The echo suppression method according to the present invention includes, for example: selecting a learning algorithm to learn an echo based on a magnitude of a reference signal transmitted to a speaker; learning the echo using the learning algorithm selected by the selecting; and removing an echo included in an input signal picked up by a microphone based on a learning result by the learning. When the magnitude of the reference signal is equal to or greater than a threshold, the selecting selects a learning algorithm using nonlinear processing. When the magnitude of the reference signal is smaller than the threshold, the selecting selects a learning algorithm using linear processing.

An echo suppression program according to the present invention is, for example, provided in a transmitting signal path that transmits an input signal picked up by a microphone of a terminal including a speaker and the microphone. The echo suppression program causes a computer to function as: an algorithm selection unit configured to select a learning algorithm to learn an echo based on a magnitude of a reference signal transmitted to the speaker, the algorithm selection unit being configured such that when the magnitude of the reference signal is equal to or greater than a threshold, the algorithm selection unit selects a learning algorithm using nonlinear processing, the algorithm selection unit being configured such that when the magnitude of the reference signal is smaller than the threshold, the algorithm selection unit selects a learning algorithm using linear processing, an echo learning unit configured to learn the echo using the learning algorithm selected by the algorithm selection unit; and an echo removal unit configured to remove an echo included in the input signal based on a learning result by the echo learning unit.

Advantageous Effects of Invention

With the present invention, the echo can be effectively removed while a processing load on an arithmetic device is reduced.

DESCRIPTION OF EMBODIMENTS

Embodiments of an echo suppression device according to the present invention will be described below in detail with reference to the drawings. The echo suppression device is a device that suppresses an echo generated during a telephone call in a voice communication system, and is used for a product into which a speaker and a microphone are integrated, for example, a headset for a telephone conference or a video conference, an on-board telephone call device, an intercom, or the like.

First Embodiment

Figure 1:
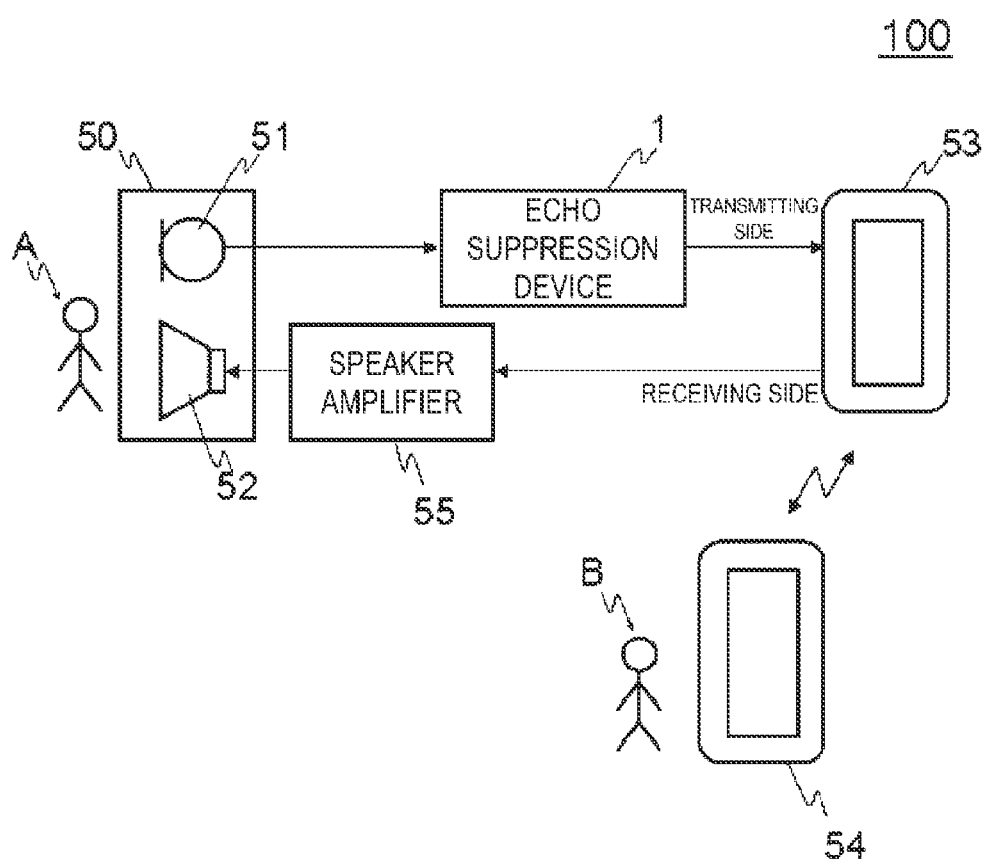
FIG. 1 is a diagram schematically illustrating a voice communication system 100 provided with an echo suppression device 1 according to a first embodiment.

FIG. 1 is a diagram schematically illustrating a voice communication system 100 provided with the echo suppression device 1 according to the first embodiment. The voice communication system 100 primarily includes a terminal 50 (for example, an on-board device, a conference system, and a mobile terminal) including a microphone 51 and a speaker 52, two communication devices 53 and 54, a speaker amplifier 55, and the echo suppression device 1.

The voice communication system 100 is a system in which a user (a user A on a near-end side) utilizing the terminal 50 (near-end terminal) is in voice communication with a user (a user B on a far-end side) utilizing the communication device 54 (far-end terminal). A voice signal input via the communication device 54 is amplified and output by the speaker 52, and a voice emitted by the user on the near-end side is collected by the microphone 51 and transmitted to the communication device 54. Thus, the user A can make an amplified voice call (hands-free call) without holding the communication device 53. The communication device 53 and the communication device 54 are connected together by a general telephone line and mutually communicable.

The echo suppression device 1 is provided on a transmitting signal path through which input signals input from the microphone 51 are transmitted from the terminal 50 to the communication device 53.

For example, the echo suppression device 1 may be configured as a dedicated board mounted on, for example, the terminal 50 in the voice communication system 100. Additionally, the echo suppression device 1 may include, for example, computer hardware and software (echo suppression program). The echo suppression program may be stored in advance in, for example, a HDD as a storage medium built into a device, such as a computer, and a ROM in a microcomputer including a CPU, and may be installed from it into a computer. Additionally, the echo suppression program may be temporarily or permanently stored (memorized) in a removable storage medium such as a semiconductor memory, a memory card, an optical disc, a magneto-optical disk, a magnetic disk, or the like.

Figure 2:
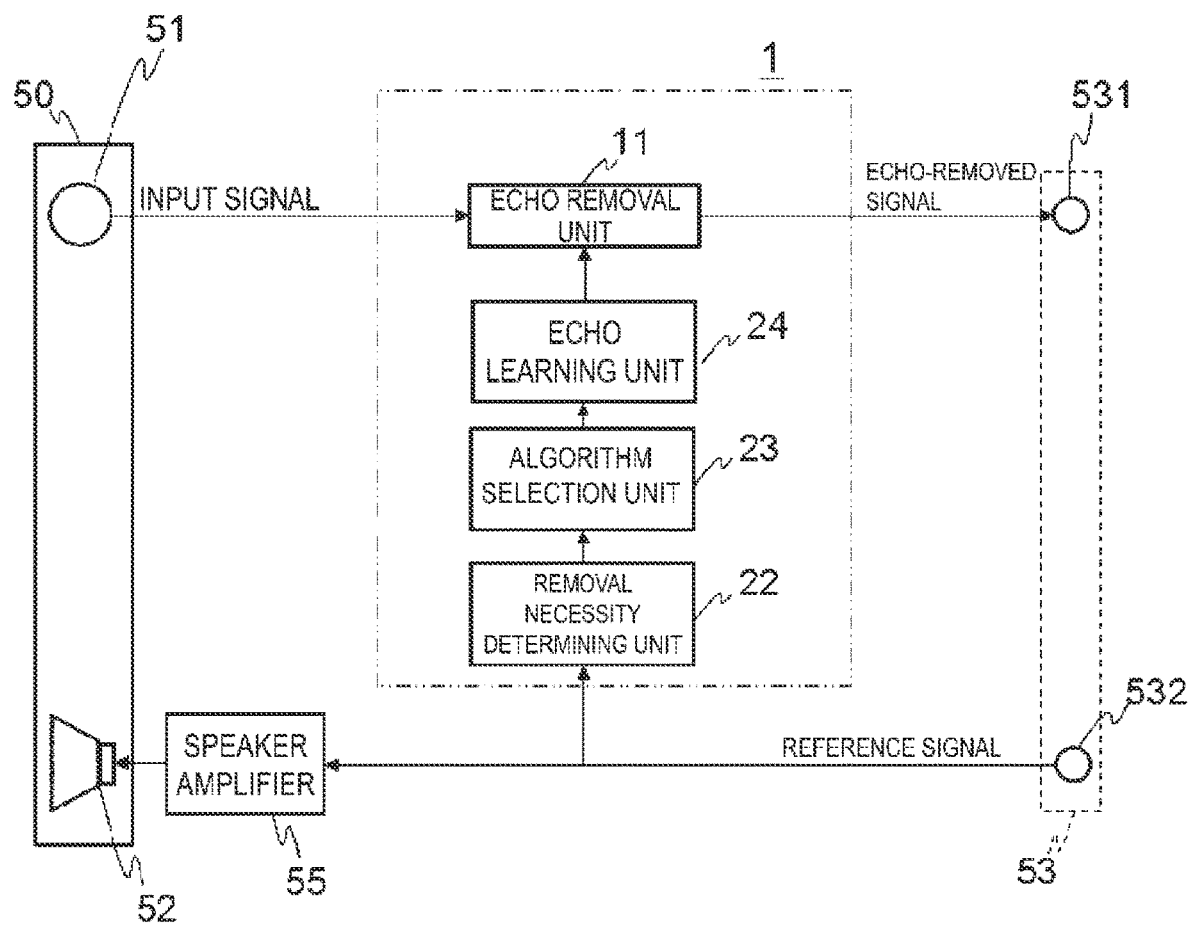
FIG. 2 is a block diagram illustrating a general configuration of the echo suppression device 1.

FIG. 2 is a block diagram illustrating a general configuration of the echo suppression device 1. The echo suppression device 1 is connected between the microphone 51 and a signal input end 531 on a transmitting side of the communication device 53. In FIG. 2, an upper signal path is a transmitting signal path through which input signals input from the microphone 51 are transmitted, and a lower signal path is a receiving signal path through which signals are transmitted to the speaker 52.

The input signal picked up by the microphone 51 and the voice signal received by the communication device 53 are input to the echo suppression device 1. The echo suppression device 1 removes an echo of the input signal based on a reference signal as the voice signal received by the communication device 53 and transmitted through the receiving signal path, and outputs the signal to the signal input end 531 on the transmitting side.

The echo suppression device 1 primarily includes an echo removal unit 11, a removal necessity determining unit 22, an algorithm selection unit 23, and an echo learning unit 24.

The echo removal unit 11 is a function unit that removes the echo from the input signal picked up by the microphone 51. The echo removal unit 11 removes the echo using a pseudo-echo signal generated by the echo learning unit 24 described later. The process by the echo removal unit 11 has already been well known, and thus, the description of the process is omitted. The signal output from the echo removal unit 11 is output to the signal input end 531 on the transmitting side, and is transmitted to the communication device 54 that the user B has via the communication device 53.

The removal necessity determining unit 22 is a function unit that determines whether to remove the echo by the echo removal unit 11 based on a magnitude of the reference signal. In a case where the magnitude of the reference signal is smaller than a threshold T2, the removal necessity determining unit 22 determines that the echo is not removed by the echo removal unit 11. In a case where the magnitude of the reference signal is equal to or greater than the threshold T2, the removal necessity determining unit 22 determines that the echo is removed by the echo removal unit 11.

The magnitude of the reference signal is obtained by a sum of sound pressures of the reference signals in a predetermined period. The magnitude of the reference signal may be obtained by summing absolute values of the reference signals in a predetermined period. The average value of the absolute values of the reference signals per unit time may be obtained as the magnitude of the reference signal.

The threshold T2 is determined based on an ambient noise on the communication device 54 side. This is because the ambient noise always input from the communication device 54 side usually does not become a large obstacle when the user A hears the voice from the user B. For example, the maximum value of the reference signal in a case where a noise level input from the communication device 54 to a signal output end 532 is 30 dB (SPL) or less can be set as the threshold T2. Also, for example, the maximum value of the reference signal can be set as the threshold T2 when a location 1 m away from the speaker 52 is sufficiently quiet (30 dB (SPL) or less).

The echo learning unit 24 is a function unit that learns the echo included in the input signal using the learning algorithm of an echo, and generates the pseudo-echo signal used to remove the echo by the echo removal unit 11. The echo learning unit 24 is configured to perform a plurality of kinds of learning algorithms. The echo learning unit 24 can perform a learning algorithm using nonlinear processing and a learning algorithm using linear processing. The echo learning unit 24 learns the echo using one learning algorithm selected by the algorithm selection unit 23, which will be described in detail next.

The algorithm selection unit 23 is a function unit that selects the learning algorithm used by the echo learning unit 24 to learn the echo. The algorithm selection unit 23 selects the algorithm based on at least one threshold to the magnitude of the reference signal. Here, the algorithm selection unit 23 determines whether the magnitude of the reference signal is equal to or greater than a threshold T1 greater than the threshold T2, and determines the learning algorithm to learn the echo based on the determination result.

The threshold T1 can be the average of the reference signals, for example, when a speaker distortion is measured at a location 1 m away from the speaker 52 and a distortion level of a sine wave occurs by 1% or more. The speaker distortion is measured using the method, for example, defined in "JIS C 5532:2014 Loudspeakers for sound system equipment."

The algorithm selection unit 23 selects the learning algorithm using the nonlinear processing when the magnitude of the reference signal is equal to or greater than the threshold T1, and selects the learning algorithm using the linear processing when the magnitude of the reference signal is smaller than the threshold T1. The learning algorithm using the linear processing is, for example, NLMS or LMS.

The removal necessity determining unit 22 and the algorithm selection unit 23 periodically determine the magnitude of the reference signal at each predetermined time interval, and switches an aspect of echo learning. In other words, the echo suppression device 1 can select the aspect of echo learning from three kinds, which are an aspect of not performing the echo learning, an aspect that learns the echo by the learning algorithm using the nonlinear processing, and an aspect that learns the echo by the learning algorithm using the linear processing. The aspect of the echo learning is configured to be automatically switched mutually based on the magnitude of the reference signal changing every moment.

Figure 3:
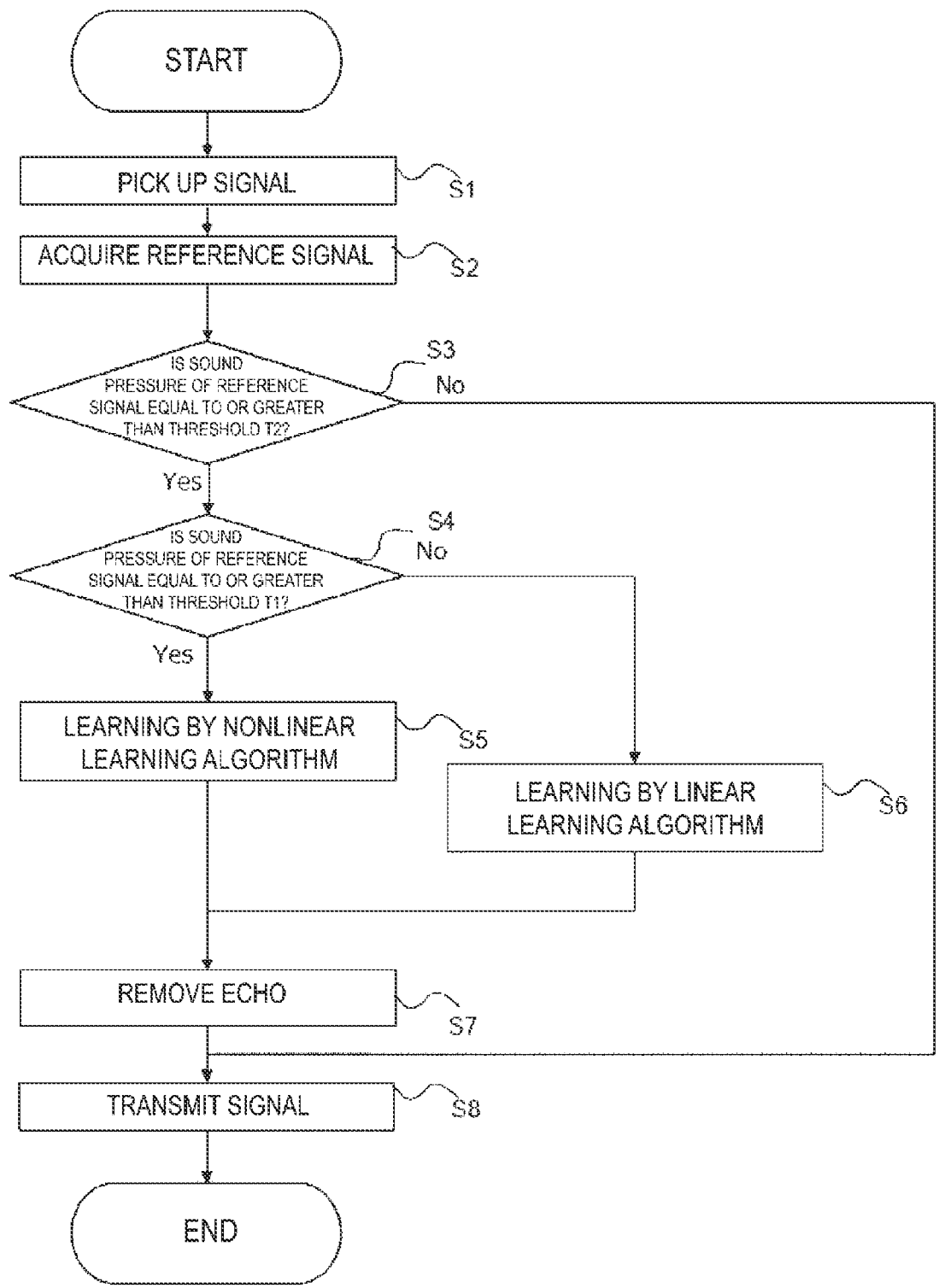
FIG. 3 is a flowchart depicting a flow of processes performed by the echo suppression device 1.

FIG. 3 is a flowchart depicting a flow of processes performed by the echo suppression device 1. First, the input signal is picked up by the microphone 51 (Step SD, and the reference signal is acquired from the signal output end 532 on the receiving side (Step S2). Then, the removal necessity determining unit 22 determines whether the magnitude of the reference signal is equal to or greater than the threshold T2 (Step S3).

When the magnitude of the reference signal is smaller than the threshold T2 (No in Step S3), the reference signal is small, that is, the echo is also small, and the echo suppression itself is not necessary. Accordingly, in this case, the echo suppression device 1 outputs the input signal to the signal input end 531 without removing the echo (Step S8). As a result, the sound output from the microphone 51 is not distorted and is output to the communication device 54 with a clear voice intact.

When the magnitude of the reference signal is equal to or greater than the threshold T2 (Yes in Step 3), the algorithm selection unit 23 determines whether the magnitude of the reference signal is equal to or greater than the threshold T1 (Step S4).

When the magnitude of the reference signal is equal to or greater than the threshold T1 (Yes in Step S4), the sound from the speaker 52 is large, that is, the echo is large, and the sound from the speaker 52 distorts. Since a distortion component is nonlinear, it is difficult to remove the echo in the learning using the linear processing. Thus, in this case, the echo learning unit 24 learns the echo by the learning algorithm using the nonlinear processing (Step S5). The learning algorithm using the nonlinear processing is large in amount of calculation, but the distortion can be more reliably removed.

When the magnitude of the reference signal is equal to or greater than the threshold T2 and smaller than the threshold T1 (No in Step S4), although an echo component is a concern, its level is low. Accordingly, in this case, the echo learning unit 24 learns the echo using the learning algorithm using the linear processing of low amount of calculation (Step S6). Since the learning algorithm using the linear processing features a small amount of calculation, applying the learning algorithm using the linear processing reduces a load on the arithmetic device.

When the echo learning is performed in Step S5 or Step S6, the echo removal unit 11 removes the echo included in the input signal based on the learnt results (Step S7). The echo removal unit 11 uses the same calculation formula for the learnt result learnt by any learning algorithm to remove the echo of the reference signal. Next, the echo suppression device 1 outputs a signal from which the echo has been removed to the signal input end 531 (Step S8).

According to the present embodiment, since the learning algorithm of the echo is selected based on the magnitude of the reference signal, the echo can be effectively removed while the processing load on the arithmetic device is reduced.

In addition, according to the present embodiment, by switching to the learning by the algorithm using the nonlinear processing in the case where the magnitude of the reference signal is large, the nonlinear distortion that occurs in the large magnitude of the reference signal can be reliably removed.

In addition, according to the present embodiment, since the same calculation formula is used to remove the echo for the learning result learnt by any learning algorithm, even when the used learning algorithm is frequently switched, the echo can be naturally removed without an uncomfortable feeling.

Note that in the present embodiment, while the threshold T1 and the threshold T2 referred to by the removal necessity determining unit 22 and the algorithm selection unit 23 are predetermined, the threshold T1 and the threshold T2 may be varied based on the value of the past reference signal or the input signal. Additionally, the echo suppression device 1 may be configured so that the threshold T1 and the threshold T2 can be rewritten by an external device appropriately connected.

In the present embodiment, while the algorithm selection unit 23 selects the learning algorithm based on one threshold, the algorithm selection unit 23 may select the learning algorithm based on a plurality of thresholds. That is, the echo learning unit 24 may be configured to perform three or more kinds of respective learning algorithms, and the algorithm selection unit 23 may be configured to select one learning algorithm based on the plurality of thresholds different from one another.

For example, when the magnitude of the reference signal is large, for example, when the reference signal is greater than a threshold T5, which is greater than the threshold T1, the algorithm selection unit 23 selects, among the learning algorithms using the nonlinear processing, a learning algorithm whose learning convergence speed is faster than that of a learning algorithm used when the magnitude of the reference signal is equal to or greater than the threshold T1 and equal to or smaller than the threshold T5. The threshold T5 can be an average of the reference signals, for example, when a test for speaker distortion is conducted at a location 1 m away from the speaker 52 and the distortion level of the sine wave occurs by 2% or more. The learning algorithm using the nonlinear processing changes the convergence speed and accuracy depending on a mathematical algorithm used to design a nonlinear filter. Thus, when the magnitude of the reference signal is greater than the threshold T5, a mathematical algorithm where an convergence speed is faster than that of the case where the magnitude of the reference signal is equal to or greater than the threshold T1 and equal to or smaller than the threshold T5. In this manner, in the case where the large distortion occurs, the speed is prioritized over the accuracy of the echo component removal, and the aimed sound from which the echo has been removed to some extent is generated fast.

For example, in the case where the magnitude of the reference signal is small, for example, when the reference signal is equal to or smaller than a threshold T6, which is smaller than the threshold T1 and greater than the threshold T2, the algorithm selection unit 23 prioritizes the accuracy over the speed of the echo component removal, and selects a learning algorithm slow in learning convergence speed and with high estimation accuracy among the learning algorithms using the linear processing. The threshold T6 is the maximum value of the reference signal, for example, when the location 1 m away from the speaker 52 is sufficiently quiet (30 dB (SPL) or less). For example, when the reference signal is greater than the threshold T2 and equal to or smaller than the threshold T6, the highly accurate LMS is used, and when the reference signal is greater than the threshold T6 and equal to or smaller than the threshold T1, the NLMS having the fast speed is used. In this manner, in the case where the echo component is small, the accuracy is prioritized over the speed of the echo component removal, and the echo component is reliably removed.

The algorithm selection unit 23 may be configured to change a parameter included in the selected learning algorithm based on the magnitude of the reference signal. Changing the parameter changes an update speed of the learning algorithm. The algorithm selection unit 23 may continuously change the parameter in proportion to the magnitude of the reference signal or may switch the parameter stepwisely. The algorithm selection unit 23 may be configured so that a parameter related to the learning speed can be changed by an external device connected as appropriate. According to this configuration, the learning speed can be adjusted more finely in accordance with the magnitude of the reference signal.

In addition, in the present embodiment, while the echo learning unit 24 generates the pseudo echo signal, the echo learning unit 24 needs not to generate the pseudo echo signal from the input signal until a predetermined period elapses from immediately after playing the speaker 52 in the generation of the pseudo echo signal. This is because, by a continuous vibration of the speaker 52 or the like, the generated voice gets into the microphone 51 until a predetermined period elapses immediately after playing the speaker 52, and therefore the input signal not caused by the reference signal is generated. However, in the case where the reference signal is input until the predetermined period elapses from immediately after the playing the speaker 52, it is preferable that the echo removal unit 11 detect the sound generated by vibration and suppress the echo without generating the pseudo echo signal by the echo learning unit 24. Whether the reference signal has been input may be detected based on the magnitude of the reference signal or may be detected by a speech by a speech detection unit. The detection of the speech has been already well known, and thus the description is omitted.

Second Embodiment

The following mainly describes a part different from the first embodiment in the second embodiment of the echo suppression device according to the present invention. The echo suppression device 2 according to the second embodiment differs from the echo suppression device 1 according to the first embodiment in that the echo suppression device 2 includes a converting unit that converts the reference signal into a function of a frequency domain and an inverse converting unit that converts the signal from which the echo has been removed into a function of a time domain. Note that the same configurations as those in the first embodiment are denoted using the same reference numerals, and descriptions thereof will be omitted in the following description.

Figure 4:
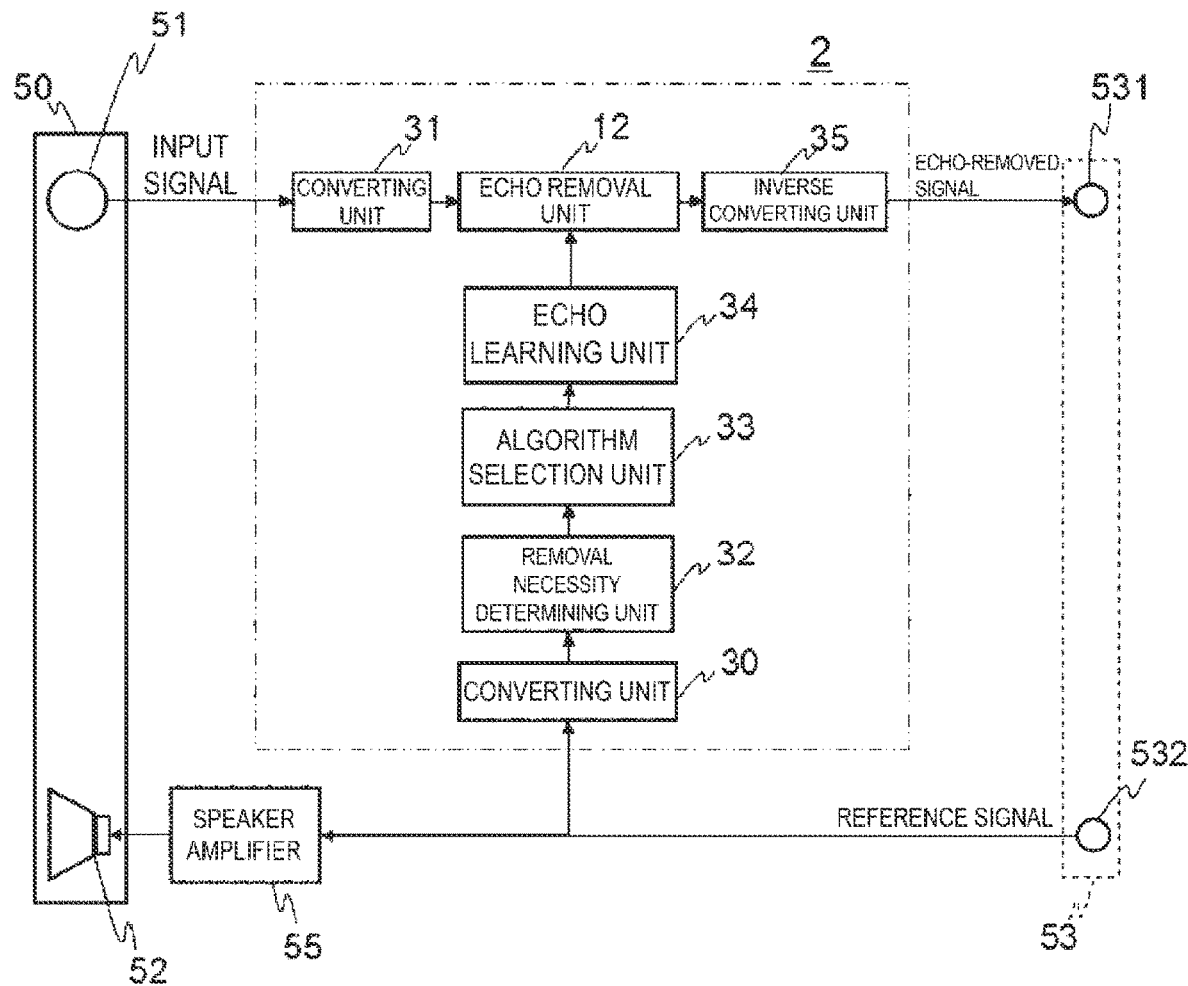
FIG. 4 is a block diagram illustrating a general configuration of an echo suppression device 2 according to a second embodiment.

FIG. 4 is a block diagram illustrating a general configuration of the echo suppression device 2 according to the second embodiment. The echo suppression device 2 primarily includes the echo removal unit 12, converting units 30, 31, a removal necessity determining unit 32, an algorithm selection unit 33, an echo learning unit 34, and an inverse converting unit 35.

The converting unit 30 is a function unit that converts the reference signal into the function of the frequency domain. The converting unit 31 is a function unit that converts the input signal into the function of the frequency domain. While the converting units 30, 31 perform the Fourier transformation in the present embodiment, the conversion into the function of the frequency domain may be performed by another conversion method.

The removal necessity determining unit 32 determines whether to remove the echo by the echo removal unit 11 for each of a plurality of frequency bands divided at a predetermined interval. The removal necessity determining unit 32 determines whether to remove the echo based on a threshold T4. The threshold T4 is defined for each frequency band. Threshold T4 is obtained by the method similar to that of the threshold T2.

The algorithm selection unit 33 selects the learning algorithm for each of the plurality of frequency bands divided at the predetermined interval. The algorithm selection unit 33 selects an algorithm based on a threshold T3. The threshold T3 is defined for each frequency band. The threshold T3 is greater than threshold T4. The threshold T3 is obtained by the method similar to that of the threshold T1.

The echo learning unit 34 learns the echo using the learning algorithm selected for each frequency band. The echo removal unit 12 removes the echo based on the learning result obtained for each frequency band.

The inverse converting unit 35 is a function unit that performs inverse transformation on a power spectral density of the signal from which the echo has been removed, and converts it into the function of the time domain. An inverse converting unit 26 performs inverse Fourier transformation, for example. An output signal of the time domain converted by the inverse converting unit 35 is input to the signal input end 531 on the transmitter side, and is transmitted to the communication device 54 that the user B has via the communication device 53.

Figure 5:
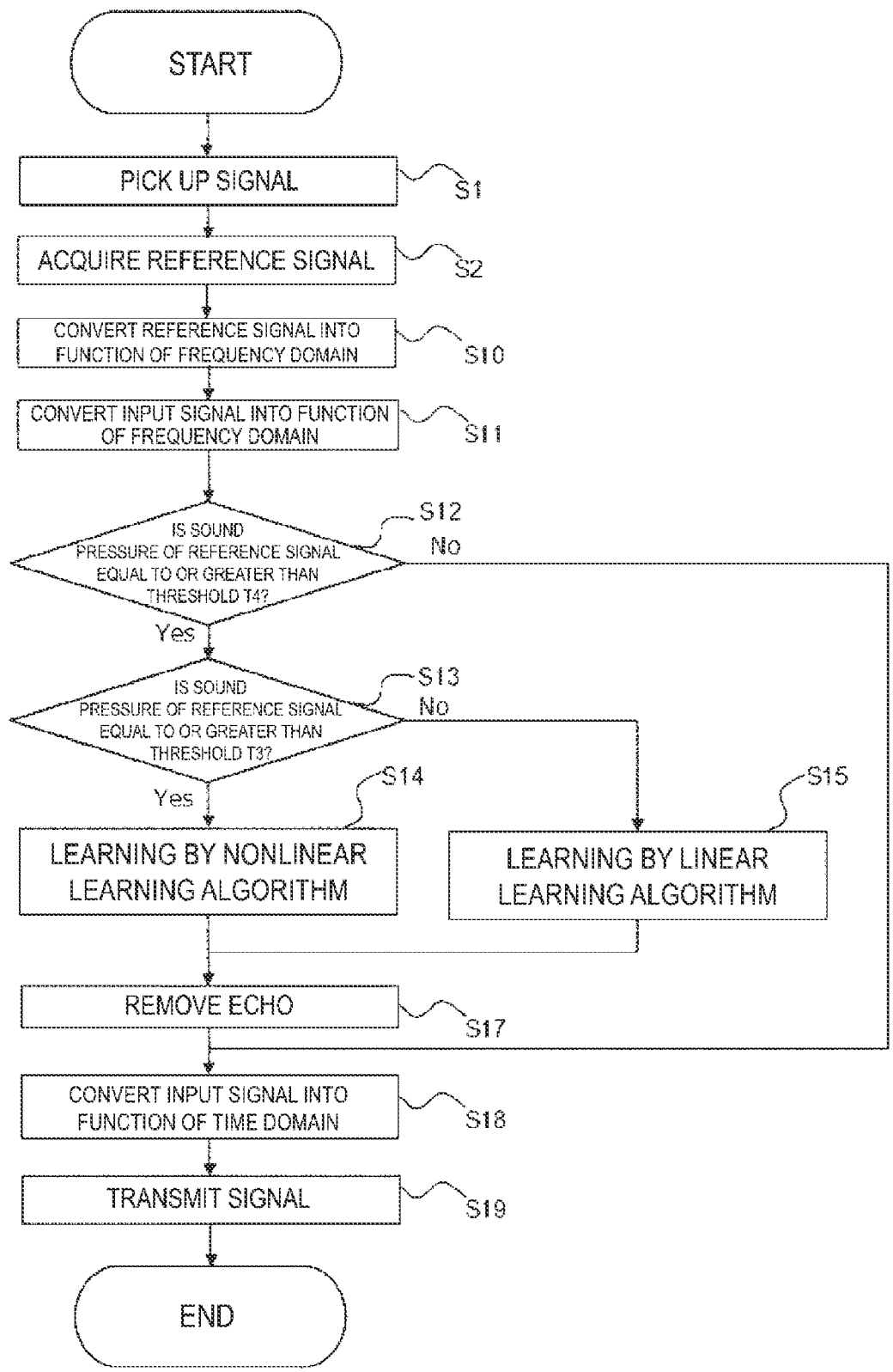
FIG. 5 is a flowchart depicting a flow of processes performed by the echo suppression device 2.

FIG. 5 is a flowchart depicting a flow of processes performed by the echo suppression device 2. When the input signal is picked up by the microphone 51 (Step S1) and the reference signal is input from the signal output end 532 on the receiving side (Step S2), the converting unit 30 converts the reference signal into the function of the frequency domain (Step S10). The converting unit 31 converts the input signal into the function of the frequency domain (Step S11). This divides the reference signal and the input signal into a plurality of frequency bands.

The removal necessity determining unit 22 determines whether to remove the echo for each frequency band. In other words, the removal necessity determining unit 22 determines whether a sound pressure of the reference signal is equal to or greater than the threshold T4 for each frequency band (Step S12). The echo suppression device 2 does not perform the echo removal in a frequency band where the power spectral density of the reference signal is smaller than the threshold T4 (No in Step S12) and advances Step S18, which will be described later.

The algorithm selection unit 23 determines whether the sound pressure of the reference signal is equal to or greater than the threshold T3 for each frequency band where the power spectral density of the reference signal is equal to or greater than the threshold T4 (Yes in Step S12) (Step S13).

The echo learning unit 24 learns the echo in the frequency band where the power spectral density of the reference signal is equal to or greater than the threshold T3 (Yes in Step S13) by the learning algorithm using the nonlinear processing based on the input signal converted into the function of the frequency domain in Step S11 (Step S14).

The echo learning unit 24 learns the echo in the frequency band where the magnitude of the reference signal is equal to or greater than the threshold T4 and smaller than the threshold T3 (No in Step S13) by the learning algorithm using the linear processing based on the input signal converted into the function of the frequency domain in Step S11 (Step S15).

The echo removal unit 12 removes the echo included in the input signal for each frequency band based on the results learnt in Steps S14, S15 (Step S17).

The inverse converting unit 35 converts the function of the frequency domain in which the echo has been removed by the echo removal unit 12 into the function of the time domain (Step S18). In addition, in the frequency band in which the power spectral density of the reference signal is smaller than the threshold T4 (No in Step S12), the inverse converting unit 35 converts the signal converted into the function of the frequency domain in Step S11 into the function of the time domain again (Step S18). Finally, the echo suppression device 2 outputs the signal converted by the inverse converting unit 35 to the signal input end 531 (Step S19).

According to the present embodiment, the echo removal can be effectively performed for each frequency band, and thus the echo can be more reliably removed.

Note that in the present embodiment, Step S11 is performed after Step S10, but Step S11 may be performed immediately before Steps S14 and S15.

The embodiments of the invention are described above in detail with reference to the drawings. Specific configurations are not limited to the embodiments and also include changes in the design or the like within a scope that does not depart from the gist of the invention.

REFERENCE SIGNS LIST

1 Echo suppression device
11, 12 Echo removal unit
22, 32 Removal necessity determining unit
23, 33 Algorithm selection unit
24, 34 Echo learning unit
26 Inverse converting unit
30, 31 Converting unit
35 Inverse converting unit
50 Terminal
51 Microphone
52 Speaker
53, 54 Communication device
55 Speaker amplifier
100 Voice communication system
531 Signal input end
532 Signal output end

The invention claimed is:

1. An echo suppression device provided in a transmitting signal path that transmits an input signal picked up by a microphone of a terminal including a speaker and the microphone, the echo suppression device, comprising:
   an algorithm selection unit configured to select a learning algorithm to learn an echo based on a magnitude of a reference signal transmitted to the speaker;
   an echo learning unit configured to learn the echo using the learning algorithm selected by the algorithm selection unit;
   an echo removal unit configured to remove an echo included in the input signal based on a learning result by the echo learning unit; and
   a removal necessity determining unit configured to determine whether to remove the echo based on the magnitude of the reference signal,
   wherein the algorithm selection unit is configured such that when the magnitude of the reference signal is equal to or greater than a first threshold, the algorithm selection unit selects a learning algorithm using nonlinear processing, and when the magnitude of the reference signal is smaller than the first threshold and larger than a second threshold which is smaller than the first threshold, the algorithm selection unit selects a learning algorithm using linear processing, and
   wherein the removal necessity determining unit is configured such that when the magnitude of the reference signal is smaller than the second threshold, the removal necessity determining unit determines that the echo is not removed by the echo removal unit.

2. The echo suppression device according to claim 1, further comprising
a converting unit configured to convert the reference signal into a function of a frequency domain,
wherein the algorithm selection unit is configured to select the learning algorithm for each of a plurality of frequency bands divided at a predetermined interval,
the echo learning unit is configured to learn the echo included in the reference signal using the learning algorithm for each of the frequency bands, and
the echo removal unit is configured to remove the echo based on the learning result by the echo learning unit for each of the frequency bands.

3. The echo suppression device according to claim 1, wherein the echo removal unit is configured to remove the echo included in the input signal using a same calculation formula for the learning result learnt by any learning algorithm.

4. An echo suppression method comprising steps of:
selecting a learning algorithm to learn an echo based on a magnitude of a reference signal transmitted to a speaker;
learning the echo using the learning algorithm selected by the selecting;
determining whether to remove the echo based on the magnitude of the reference signal,
removing an echo included in an input signal picked up by a microphone based on a learning result by the learning,
wherein when the magnitude of the reference signal is equal to or greater than a first threshold, a learning algorithm using nonlinear processing is selected, and
when the magnitude of the reference signal is smaller than the first threshold and larger than a second threshold which is smaller than the first threshold, a learning algorithm using linear processing is selected, and
when the magnitude of the reference signal is smaller than the second threshold, it is determined that the echo is not removed by the echo removal unit.

5. A non-transitory computer readable medium storing echo suppression program provided in a transmitting signal path that transmits an input signal picked up by a microphone of a terminal including a speaker and the microphone, the echo suppression program causing a computer to execute steps of:
selecting a learning algorithm to learn an echo based on a magnitude of a reference signal transmitted to the speaker,
when the magnitude of the reference signal is equal to or greater than a first threshold, selecting a learning algorithm using nonlinear processing,
when the magnitude of the reference signal is smaller than the first threshold and larger than a second threshold which is smaller than the first threshold, selecting a learning algorithm using linear processing,
learning the echo using the learning algorithm; and
removing an echo included in the input signal based on a learning result,
wherein when the magnitude of the reference signal is smaller than the second threshold, the echo is not removed.

* * * * *